United States Patent
Lorenzo et al.

(10) Patent No.: US 11,137,996 B2
(45) Date of Patent: Oct. 5, 2021

(54) COGNITIVE SERVICE UPDATES VIA CONTAINER INSTANTIATION

(71) Applicant: International Business Machines Corporation, Armonk, NY (US)

(72) Inventors: Mario J. Lorenzo, Miami, FL (US); Jennifer L. La Rocca, Cary, NC (US); Rebecca L. Dahlman, Rochester, MN (US); Joshua M. Lee, Rochester, MN (US); Kristin E. McNeil, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 16/289,589

(22) Filed: Feb. 28, 2019

(65) Prior Publication Data
US 2020/0278860 A1 Sep. 3, 2020

(51) Int. Cl.
*G06F 8/658* (2018.01)
*G06F 8/71* (2018.01)
(Continued)

(52) U.S. Cl.
CPC .............. *G06F 8/658* (2018.02); *G06F 8/71* (2013.01); *G06F 40/154* (2020.01);
(Continued)

(58) Field of Classification Search
CPC .......... G06F 8/658; G06F 8/71; G06F 40/154; G06F 40/284; G06F 40/295; G06F 17/227; G06F 17/277; G06F 17/278
(Continued)

(56) References Cited

U.S. PATENT DOCUMENTS 7,797,403 B2    9/2010    Vedula
8,868,701 B1    10/2014    Peters
(Continued)

OTHER PUBLICATIONS

Linh Manh Pham, et al.; "An Adaptable Framework to Deploy Complex Applications onto Multi-cloud Platforms"; HAL archives-ouvertes.fr; Nov. 23, 2015; 7 pages.
(Continued)

*Primary Examiner* — Qing Chen
*Assistant Examiner* — Mohammed N Huda
(74) *Attorney, Agent, or Firm* — Fabian VanCott; Steven L. Nichols (57) ABSTRACT

According to a computer-implemented method, a cognitive model container is created. The container includes a set of artifacts. Each artifact includes 1) content used by a cognitive service to convert unstructured text into structured text and 2) metadata. During deployment of a container, for each artifact a set of deployment descriptors are automatically identified. The deployment descriptors identify how the artifact is to be executed in the cognitive service. Also, during deployment of the container, content of an artifact is pushed to a number of cognitive services based on the deployment descriptors. The container is instantiated along with the set of artifacts to the cognitive service. During runtime execution of the container, content of each artifact in a container is obtained and unstructured text is converted into structured text based on the content of the artifacts.

19 Claims, 5 Drawing Sheets

(51) Int. Cl.
   *G06F 40/154* (2020.01)
   *G06F 40/284* (2020.01)
   *G06F 40/295* (2020.01)
   *G06F 40/30* (2020.01)
   *G06F 40/117* (2020.01)

(52) U.S. Cl.
   CPC .......... *G06F 40/284* (2020.01); *G06F 40/295* (2020.01); *G06F 40/117* (2020.01); *G06F 40/30* (2020.01)

(58) Field of Classification Search
   USPC .......................................................... 717/170
   See application file for complete search history.

(56) References Cited

U.S. PATENT DOCUMENTS

| | | |
|---|---|---|
| 9,003,387 B2 | 4/2015 | Van Camp |
| 9,146,729 B2 | 9/2015 | Mallur |
| 10,031,783 B2 | 7/2018 | Jalagam |
| 10,095,496 B2 | 10/2018 | Winterfeldt |
| 10,922,493 B1* | 2/2021 | Das et al. ............. G06F 40/295 |
| 2011/0083138 A1 | 4/2011 | Sivasubramanian |
| 2014/0280072 A1* | 9/2014 | Coleman ............... G06F 16/248 707/722 |
| 2015/0212812 A1* | 7/2015 | Tripathi et al. ........... G06F 8/60 717/120 |
| 2016/0259780 A1* | 9/2016 | Panemangalore et al. .................. G06F 40/284 |
| 2017/0147333 A1* | 5/2017 | Bregler et al. ............ G06F 8/71 |
| 2018/0365229 A1* | 12/2018 | Buhrmann et al. ... G06F 40/295 |
| 2019/0074082 A1* | 3/2019 | Buckler et al. ........ G06F 40/284 |

OTHER PUBLICATIONS

Gideon Juve, et al.; "Automating Application Deployment in Infrastructure Cloud"; ResearchGate; Nov. 2011; 9 pages.

* cited by examiner

COGNITIVE SERVICE UPDATES VIA CONTAINER INSTANTIATION

BACKGROUND

The present invention relates to the update of cognitive services, and more specifically to the updating of artifacts used in cognitive services. Natural language processing is an operation wherein a computer can collect information from unstructured text. That is, natural language processing is performed on unstructured text to extract information that can be used in a structured way. For example, from the text "He is 40 years old" a natural language processor can extract the insight of "age" with a value of 40. Such information provides context to the unstructured text. That is, natural language processing allows a computing device to understand natural language data. Other forms of cognitive models are also useful to provide a deeper understanding of unstructured text.

SUMMARY

According to an embodiment of the present invention, a computer-implemented method is described. According to the method, a cognitive mode container is created. A container includes a set of artifacts. Each artifact includes 1) content used by a cognitive service to convert unstructured text into structured text and 2) metadata. During container deployment, a set of deployment descriptors is identified for each artifact. Deployment descriptors identify how the artifact is to be executed in the cognitive service. Also, during container deployment, the content of the artifact is pushed to a number of cognitive services based on the data in the deployment descriptors. The container is instantiated along with the set of artifacts to the cognitive service. During runtime execution of the container, content information is obtained and unstructured text is converted into structured text based on the execution of the content of the artifact.

The present specification also describes a system. The system includes a builder to create a cognitive model container. A container includes a set of artifacts. Each artifact includes 1) content used by a cognitive service to convert unstructured text into structured text and 2) metadata. An orchestrator of the computing system, during container deployment, identifies, for each artifact, a set of deployment descriptors which identify how the artifact is to be executed in the cognitive service and pushes the content of an artifact to a number of cognitive services based on the data in the deployment descriptors. An instantiator of the computing system instantiates the container along with the set of artifacts to the cognitive service.

The present specification also describes a computer program product. The computer program product includes a computer readable storage medium having program instructions embodied therewith. The program instructions executable by a processor cause the processor to create a cognitive model container, which container includes a set of artifacts, each artifact including 1) content used by a cognitive service to convert unstructured text into structured text and 2) metadata and to associate metadata with each artifact. The program instructions are also executable to cause the processor to, during container deployment, 1) identify, for each artifact using the metadata associated with the artifact, a set of deployment descriptors which identify how the artifact is to be executed in the cognitive service and 2) push the content to a number of cognitive services based on the deployment descriptors. The program instructions are also executable to cause the processor to, determine if a conflict occurs with an existing artifact in the container. When a conflict occurs, the program instructions are executable to cause the processor to perform at least one of 1) determine if the service should be updated with the artifact and 2) generate an error message. The program instructions are also executable to instantiate the container along with the set of artifacts to the cognitive service. Lastly, during runtime execution of the container, the program instructions are executable to obtain the content and convert unstructured text into structured text based on the content of the artifact.

DETAILED DESCRIPTION

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cognitive services refer to an offering from a service provider that performs one or more of natural language processing (NLP), machine-learning, pattern recognition, or that exhibits artificial intelligence. Historically, computers were unable to understand natural spoken language and the variety of ways a particular concept could be shared. For example, the word "foot" can be used as an indication of a body part or as a unit of measurement and computing devices could not determine which form of the word is intended. Moreover, while computers can understand words, for example as included in code, a computer could not extract meaning from the text. This is because natural language is in an unstructured and complex form.

The various types of cognitive services add structure to unstructured text and provide advanced analytics of unstructured text. For example, a cognitive service may perform complex operations to determine the proper interpretation of a term. Such cognitive services allow an organization to unlock information from unstructured data. Not only do these services extract data, they can also weigh context and conflicting data.

To achieve this end, the cognitive services include self-learning operations such as data mining, pattern recognition, and NLP. NLP refers to a method where natural language is interpreted into a form understandable by computers. However, as described above, the present method may also be used with other types of cognitive models, such as a machine-learning model. In machine-learning, a user trains the machine-learning model with sample phrases. The machine learning model then learns the language patterns by using neural networks and/or statistical algorithms. Accordingly, while the present specification describes an NLP model optimization, the method and system described herein could be used to visualize a machine-learning model as well as other cognitive models.

A specific example of a cognitive service being implemented in a particular domain is now given. In this example the domain is the medical industry. In this example, unstructured text such as medical reports, discharge summaries, and physician's notes contain valuable information. Historically, to extract this information, each document would have to be individually analyzed. However, using cognitive models, domain-specific insight can be extracted from large quantities of these unstructured files by a computing system to ascertain a wide variety of medically relevant information including, but not limited to, symptoms, diseases, allergies, medications, and patient profile information. This information can assist in the proper diagnosis of a patient as well as the formulation of a successful treatment strategy. In this example, a user may develop a cognitive model built and customized by a development system that generates clinical findings output from unstructured text input.

In many cases, a cognitive model may need to be customized. For example, different industries such as medical, manufacturing, etc. may have specific cognitive objectives and an out-of-the-box solution may not work across industries. Even within a particular industry, a particular customer may desire a specific cognitive model that analyses unstructured text in a particular way and presents the structured text in a particular way. Accordingly, a developer or other user may build a cognitive model for a customer's particular use case.

In general, cognitive service life cycles do not follow a typical development life cycle. That is, for cognitive services, a developer may develop a service based on certain requirements, but the end solution may not be perfect. This is due to the above-mentioned problem that natural language has various patterns, and it is nearly impossible for a development team to know all the variations at development time. However, a cognitive service will keep improving over time as the corpora, or database from which the service self-learns, increases in size, or is manually updated. For example, over time, the cognitive model be able to identify the subject of the sentence and may just identify the word when it is a subject of the sentence. In yet another example, a word or phrase that was originally in the cognitive system may be removed because it was producing a false positive. In some examples, a cognitive model does not improve based on self-learning. For example, a rules-based NLP system may not self-learn while a machine learning system learns based on feedback or retraining. In summary, over time cognitive services can be updated either automatically or via user input to refine the way patterns are identified and the way they process data to be more reliable in their data extraction and more capable of anticipating new problems and model possible solutions.

Given the unique characteristics of a cognitive services, it would be difficult, expensive, and largely ineffective for a development team to use a typical life cycle to make changes based on language variation. That is, in general, an update may require restarting a server such that the changes may take effect. For example, changes to the natural language cognitive models result in restarting the runtime application server to deploy the new code. This is difficult in an environment where multiple customers are accessing the same service. For example, a restart of a cognitive service server may cause the system to be brought down, thus interrupting multiple end user's experience. Moreover, when an application is restarted, additional, and sometimes unanticipated, issues may be introduced. In an extreme case, the application may not even restart.

Accordingly, the present specification describes a method and system that allow for the effective propagation of updates to various cognitive services. Specifically, the cognitive services may execute a variety of modular artifacts which are packaged together into containers. The artifacts are domain-specific modules that are used by a cognitive service to convert the unstructured text into a structured text in a particular way, for example in a fashion that is relevant in a particular domain.

Accordingly, the present specification describes a disconnected mechanism such that the server that contains the cognitive service can be manipulated without being restarted. A container is created with artifacts (content) used by a cognitive service. This container is then deployed. Metadata identifying the artifact type in the container identifies certain deployment descriptors. These deployment descriptors identify the cognitive services that utilize the artifacts and also describe how to deploy the artifact to the particular cognitive service. In some examples, an atomic transaction is created over a set of transaction updates to allow for an undo functionality. Once all artifacts in the container are processed, the instantiated container is made available to the respective cognitive services. At runtime, a cognitive service automatically utilizes the instantiated container. Accordingly, the present specification describes a way to disperse multiple artifacts out to multiple cognitive services without requiring a shutdown of the server that drives the cognitive service.

The method, system, and computer program product of the present specification provide a number of benefits. For example, the method and system simplify development and implementation of the cognitive model. Specifically, the instantiation, or the making available of the cognitive model is made simpler as a server is not re-started. As a re-start can lead to service interruption and user frustration, the system and method lead to a more streamlined development cycle. As another example, the present method, system, and computer program product provide simplified use. For example, a modeler/subject matter expert may avoid being involved with the deployment of the modular pieces of the cognitive model to the various cognitive services, an area with which they may not be familiar. That is, they may click a button and the system determines how/where to deploy each piece of the cognitive model specific to that particular container (cognitive model).

Not only do the current method and system improve the process of cognitive model development, but they also enhance the operation of the computing device on which they are implemented. For example, the proposed method allows for the development of more efficient and optimized cognitive models. That is, rather than duplicating a portion of a cognitive model for each service that implements that portion, that portion may be referenced by each cognitive model. That is, if an update to a particular aspect of a cognitive model is to be made, historically a developer would have to update each cognitive model individually. By comparison, by modularizing the cognitive model, a particular portion of the cognitive model may be updated and pushed to the different services that implement that portion. Cognitive models that are efficient and optimized can run faster, and take up less space. Thus, the present method and system improve memory utilization as well as increase processor bandwidth by resulting in less hardware processing power used to run the analysis of the cognitive model against unstructured text.

As yet another example, modularizing the cognitive model into containers allow the cognitive service to be easily updated without significant downtime. As such, there is no application server restart needed. Avoiding unnecessary server restart results in higher stability of the service and decreased downtime. As cognitive solutions generally have many iterative updates to improve the output, a service which minimizes the points of failure as described in the present specification allows these services to be easily modified such that they can continue to provide useful and reliable output all while minimally impacting the system during such periods of update.

As used in the present specification and in the appended claims, the term "service" or similar language refers broadly to an extension that provides ready-to-use functionality. For example, in the medical industry a cognitive service may perform any number of cognitive operations, such as machine-learning, natural language processing, pattern recognition, etc. on unstructured medical documents to generate structured text in a medical domain.

Further, as used in the present specification and in the appended claims, the term "deployment" refers to a stage of development where a container is packaged together with its configuration properties for testing prior to instantiation and making the container available to services.

Further, as used in the present specification and in the appended claims, the term "endpoint" refers to an application programming interface (API) that executes a particular functionality.

Even further, as used in the present specification and in the appended claims, the term "container" refers to a container of domain-specific and related artifacts, which artifacts are used to convert unstructured text into structured text.

Even further, as used in the present specification and in the appended claims, the term "artifact" refers to a piece of the cognitive model and are used to convert unstructured text into structured text. An artifact may take many forms including a dictionary of terms, a definition of clinical attributes that are particular to a given domain, or a set of rules on how to infer clinical attributes from those discovered via the natural language processing of the unstructured text. Artifacts may include other pieces of the cognitive model as described below.

Even further, as used in the present specification and in the appended claims, the term "deployment descriptor" refers to metadata that describes how the artifact is to be implemented during execution. The deployment descriptors may indicate which cognitive services the related artifact is to be sent to and may indicate how a system communicates with the service to deploy a given artifact.

As used in the present specification and in the appended claims, the term "a number of" or similar language is meant to be understood broadly as any positive number including 1 to infinity.

Figure 1:
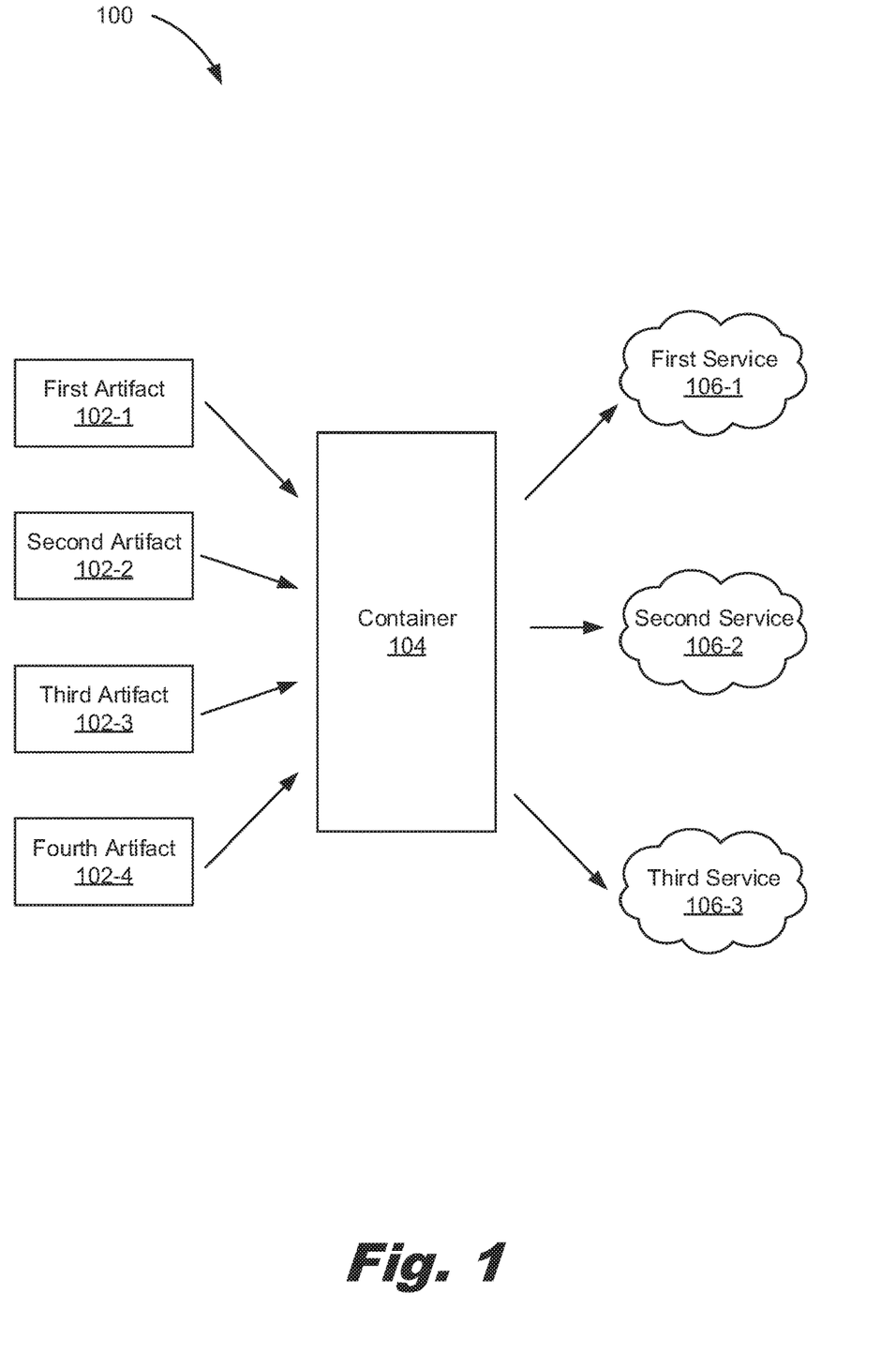
FIG. 1 depicts an environment for updating artifacts used by a cognitive service, according to an example of the principles described herein.

Turning now to the figures, FIG. 1 depicts an environment (100) for updating artifacts (102) used by a cognitive service (106), according to an example of the principles described herein. As described above, a cognitive service (106) refers to a packaged functionality available to a consumer. For example, a cognitive service (106) may provide analysis of unstructured text in a particular domain and may convert the unstructured text into structured text. As different domains, i.e., industries, may have different criteria, structures, terminology, and data formats, the services (106) may provide functionality developed and unique to a particular domain. Moreover, different consumers within a particular industry may even have preferences as to how unstructured text is analyzed. For example, different departments within a hospital may have different codes, terminologies, or indicia they are interested in. As such, the cognitive services (106) may be customized.

To facilitate such a customization, containers (104) of domain-specific content are passed to the different services (106). That is, a container (104) may execute a particular functionality, and groupings of these containers (104) may be called by a cognitive service (106). The collection of containers (104) may define a model of the cognitive service (106).

As described above, a single container (104) may be used by various cognitive services (106). For example, a container (104) may be used in different cognitive models for customizing natural language processing for a given domain. Thus, in general a container (104) may include a packing of a number of artifacts (102) that indicate how to customize the cognitive processing for a given domain. As specific examples one container (104) may relate to lung cancer and another container (104) may relate to social health.

A container (104) can be further divided into artifacts (102-1, 102-2, 102-3, 102-4. In general, an artifact (102) includes content that is used by a cognitive service (106) to execute its particular functionality. That is, an artifact (102) allows a user to customize the operation of a particular cognitive service (106). For example, in a medical industry, a particular cognitive service (106) may be interested in identifying cancer in patients. Accordingly, it may be important to find information about tumor staging. The container (104) and the artifacts (102) in the container (104) allow for the customization of the related service (106) to hone in on such tumor staging information. In other words, the artifacts (102) represent what the cognitive service (106) is executing when a piece of unstructured text is to be analyzed.

An artifact (102) may take many forms. In one example, an artifact 102 may be a compiled dictionary of medical terms against which unstructured text can be compared or from which unstructured text can be identified. In another example, the artifact (102) may be a definition of clinical attributes that are particular to a given domain. In another example, an artifact (102) may be a set of rules. For example, in a medical domain, the artifact (102) may be a set of rules on how to infer clinical attributes from those discovered via the natural language processing of the unstructured text. While particular reference is made to a few examples of artifacts (102), other types of artifacts (102) also exist and may be used in structuring a cognitive model for a consumer. Thus, in summary, an artifact (102) includes domain-specific content within a container (104). The artifacts (102) include configuration information for the cognitive model. The artifact (102) may be of varying types including a dictionary of terms, clinical attributes, derived concepts, derived clinical attributes, filters, qualifiers, and CPT mapping information.

A specific example of a cognitive model includes multiple artifacts (102) in a container (104) entitled "Movies" is now presented. In this example, the container has five artifacts (102). A first artifact (102) is a dictionary type artifact (102) named "Movies", a second a derived concept type artifact (102) with a specific derived concept named "Derived Actor." A third artifact is an attribute set artifact (102) named "Actor" and a fourth artifact (102) is a filter-type artifact to remove the identification of "animation." In this example, a first artifact (102) is defined as follows:

1) Dictionary:
Name=Movies
Concept: action
Concept: documentary
Concept: drama movie
Concept: animation This dictionary-type artifact named Movies has four concepts: action, documentary, drama, and animation. Accordingly, if the words "action", "documentary", "drama", or "animation" are located in the unstructured text, then a Movies annotation is identified at runtime. Still in this example, a second artifact (102) is defined as follows:

2) Dictionary:
Name=Actor Action
Concept: acts surface form performs

This dictionary-type artifact named Actor Action has a single concept: acts with a surface form of performs. Accordingly, if the words "acts" or "performs" are located in the unstructured text then an Actor Action annotation is identified at runtime. For example, she acts in drama movies. Still in this example, a third artifact (102) is defined as follows:

3) Derived Concept:
Derived Concept: Derived Actor:
Condition: <Actor Action ><Movie>
Allow tokens This derived concept artifact contains a derived concept and has the name Derived Actor. Accordingly, when an Actor Action (from Artifact 2) annotation is followed by a Movie (from Artifact 1 above) annotation within the scope (e.g.: sentence, document, line or paragraph) in the unstructured text, then a Derived Actor annotation is identified at runtime. Still in this example, a fourth artifact (102) is defined as follows:

4) Attribute
Name=Actor
Derived Actor!=null
Defines the levels as values

This attribute set artifact contains an attribute named Actor. If a concept of Derived Actor (from Artifact 3 above) exists or a concept equal to Actor is identified, then an attribute of Actor is returned with a value of true or yes. Still in this example, a fifth artifact (102) is defined as follows:

5) Filter
Removed animation.

This Filter artifact contains an exclude condition to exclude the phrase "animation." That is, the Movies annotation will be removed associated with the phrase "animation" so it is not identified as a Movie of interest for the cognitive model. This may be used if a user is reusing the dictionary. For example, in one case, the annotation Movies may include "animation," but in another use case it is not. Accordingly, this term may be kept in the Dictionary-type attribute, but may be removed in your specific container.

In addition to the content, an artifact (102) also includes metadata by which the artifact (102) may be associated with deployment descriptors. Additional detail regarding the use of the metadata of the artifact (102) is provided below in connection with FIG. 2.

Figure 2:
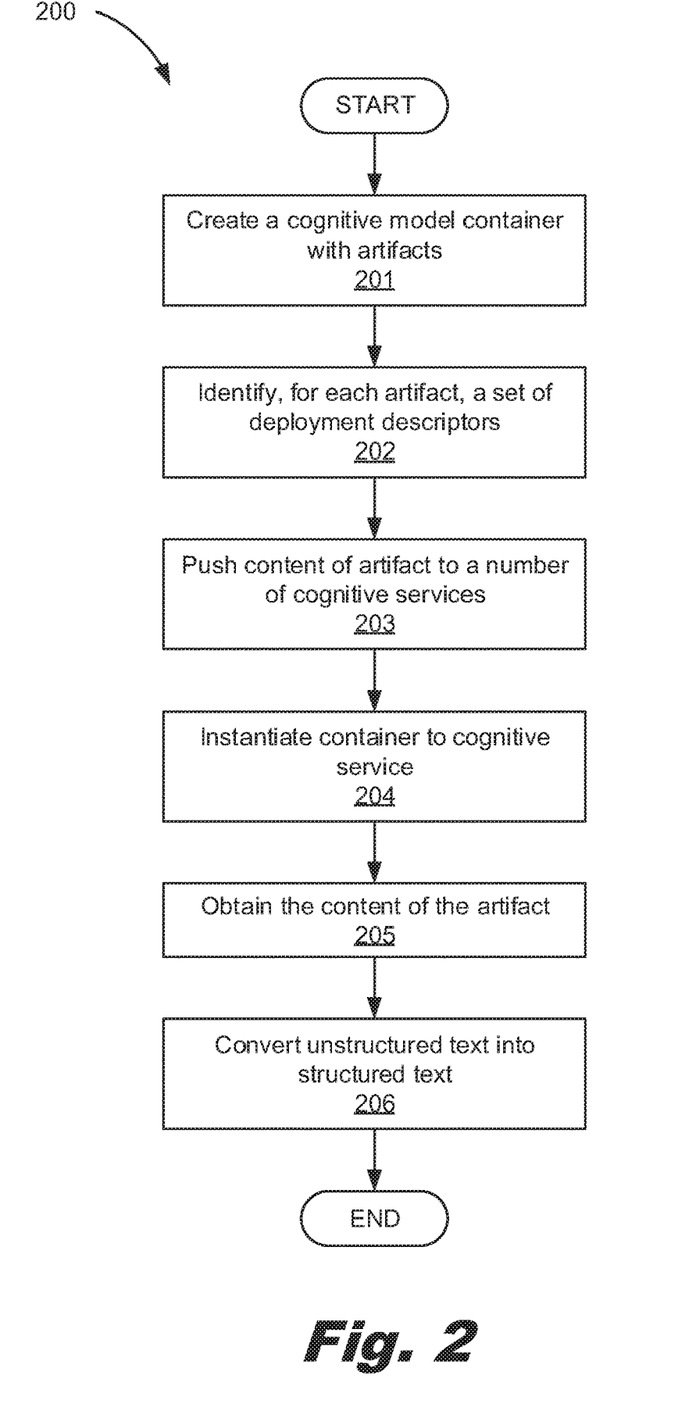
FIG. 2 depicts a flowchart of a method for updating artifacts used by a cognitive service, according to an example of the principles described herein.

FIG. 2 depicts a flowchart of a method (200) for updating artifacts (FIG. 1, 102) used by a cognitive service (FIG. 1, 106), according to an example of the principles described herein. According to the method (200), a cognitive model container (FIG. 1, 104) is created (block 201). As described above, a container (FIG. 1, 104) is a container of artifacts (FIG. 1, 102), which artifacts (FIG. 1, 102) represent content used by the cognitive service (FIG. 1, 106) to execute a particular domain-specific functionality. The content may be of a variety of types including a dictionary of terms, rules to define attributes, etc. In general, the artifacts (FIG. 1, 102) represent the tools needed to convert unstructured text into structured text. In some examples, the container (FIG. 1, 104) includes a set of artifacts (FIG. 1, 102) that relate to a particular domain. For example, within the medical industry, a container (FIG. 1, 104) may relate to the social health domain and accordingly, may include an artifact (FIG. 1, 102) with dictionary terms specific to the area of social health such that any unstructured text may be identified by the terms found in the dictionary. Another artifact (FIG. 1, 102) of this container may identify certain social health related concepts.

In addition to the content, the artifact (FIG. 1, 102) includes metadata by which deployment descriptors may be associated with the artifact (FIG. 1, 102). As will be described below, the deployment descriptors instruct a cognitive service (FIG. 1, 106) how to implement the artifact (FIG. 1, 102). Such a creation (block 201) of a container (FIG. 1, 104) may be done by a developer. For example, a consumer may approach a developer with specific tasks to be completed as part of a cognitive model. Accordingly, the developer may generate the container (FIG. 1, 104) that includes the artifacts (FIG. 1, 102) to carry out this particular cognitive model.

Once created, the container (FIG. 1, 104) is deployed. That is, it is passed from the development service to an orchestration service that retrieves the output of the build operation and packages it with the configuration properties such that it can be tested.

As part of the deployment of the container (FIG. 1, 104), each artifact (FIG. 1, 102) is processed and the container (FIG. 1, 104) is instantiated. Specifically, for each artifact (FIG. 1, 102) a set of deployment descriptors are identified. As described above, the deployment descriptors describe how the related artifact (FIG. 1, 102) will be deployed and executed in the cognitive service (FIG. 1, 106). For example, a deployment descriptor may provide a set of operations that define how to add, update, or delete an artifact (FIG. 1, 102). Each operation may include information about the target cognitive service (FIG. 1, 106) such as the end-point, the mime-type, the hypertext transfer protocol (http) operation and other information. In another example, a deployment descriptor may include conditions. For example, if the artifact (FIG. 1, 102) is related to a pre-built annotator, then the deployment descriptor may determine which service (FIG. 1, 106) to use for deployment and execution. That is, the deployment descriptor may identify a number of cognitive services (FIG. 1, 106) to which the content of the artifact (FIG. 1, 102) is to be pushed.

In some examples, the set of deployment descriptors are identified from the metadata of the artifact (FIG. 1, 102). Accordingly, during creation (block 201) of the container (FIG. 1, 104), certain metadata may be associated with the different artifacts (FIG. 1, 102). That is, an artifact (FIG. 1, 102) may be tagged with metadata that triggers certain deployment descriptors.

Based on the information included in the deployment descriptors, the content of the artifact (FIG. 1, 102) is pushed (block 203) to a number of cognitive services (FIG. 1, 102). That is, as described above, the deployment descriptors may identify which cognitive service (FIG. 1, 106) relies on a particular artifact (FIG. 1, 102) and the content, i.e., the dictionary, json object, xml file, binary executable file, set of rules, etc., is made available to those cognitive services (FIG. 1, 106). In some examples, the pushing (block 203) of the content of the artifact (FIG. 1, 102) is done via hypertext markup language (html) processing.

The container (FIG. 1, 104) can then be instantiated (block 204) along with the set of artifacts (FIG. 1, 102) to the cognitive service (FIG. 1, 106). That is, once the container (FIG. 1, 104) has properly been deployed and tested, it is created and passed to a server where a particular cognitive service (FIG. 1, 106) can access the container (FIG. 1, 104).

In some examples, the instantiation (block 204) may include replacing an existing artifact (FIG. 1, 102) with a modified artifact (FIG. 1, 102). That is, over time new developments may improve the performance of a particular cognitive service (FIG. 1, 106). For example, a dictionary may be updated with new terms, or a set of rules may be modified to more accurately characterize unstructured text. Accordingly, in this example, upon instantiation, an existing container (FIG. 1, 104) may be replaced with a modified container (FIG. 1, 104). In another example, the artifact (FIG. 1, 102) may be a newly created artifact (FIG. 1, 102) that is inserted into the container (FIG. 1, 104). In this example, no removal of an existing artifact (FIG. 1, 102) is necessary.

In some examples, the instantiation (block 204) may be performed without the reboot of a system on which the container (FIG. 1, 104)/artifact (FIG. 1, 102) is to be stored. As described above, being able to instantiate without reboot provides significant benefit as a reboot operation may prove detrimental to user experience and system performance.

Accordingly, during runtime execution of the container (FIG. 1, 104), the content that was originally pushed to the server is obtained (block 205) and executed. That is, the content of the artifact (FIG. 1, 102) is used to convert (block 206) unstructured text into structured text.

Figure 3:
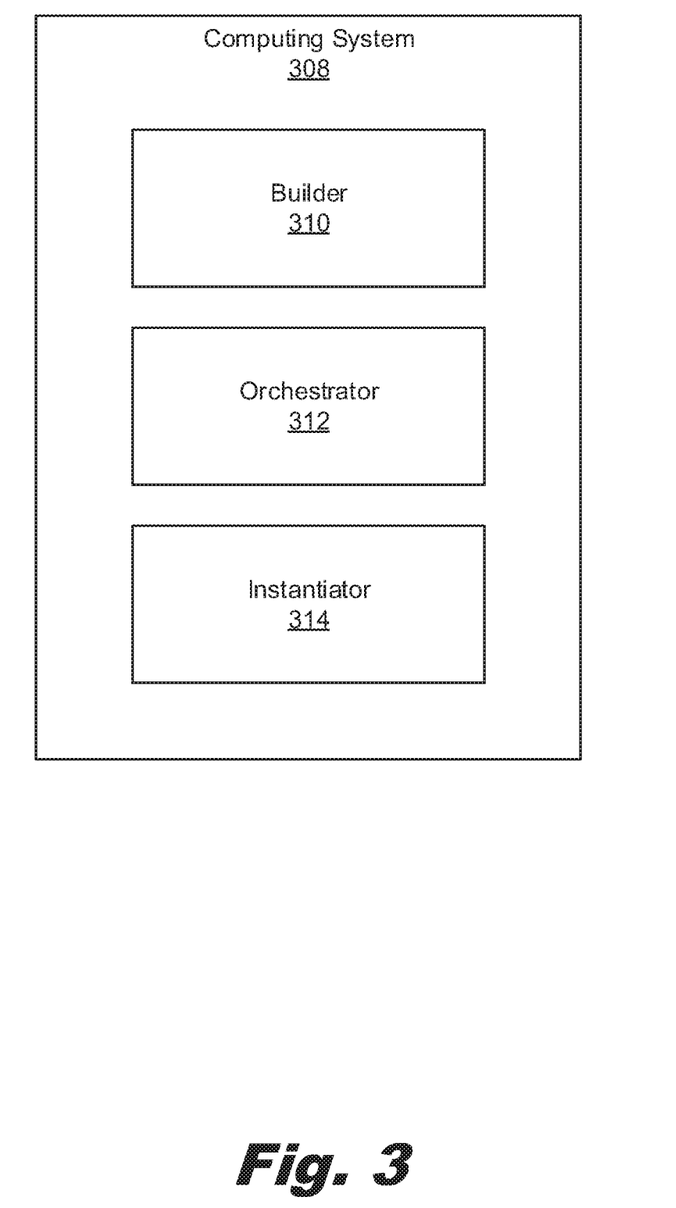
FIG. 3 depicts a computing system for updating artifacts used by a cognitive service, according to an example of principles described herein.

FIG. 3 depicts a computing system (308) for updating artifacts (FIG. 1, 102) used by a cognitive service (FIG. 1, 106), according to an example of principles described herein. To achieve its desired functionality, the computing system (308) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. Alternatively, one processor may execute the designated function of each of the components.

In general, the computing system (308) may be disposed on any variety of computing devices. For example, the computing device may be on a desktop computer or on a laptop computer, or any other such device that includes processors and hardware components.

The computing system (308) includes a builder (310). The builder (310) may be used by a developer to create a cognitive model container (FIG. 1, 104). That is, a developer, using a builder (310) interface, may identify, create, or otherwise obtain the artifacts (FIG. 1, 102) that form the building blocks of a cognitive model. As described above, the artifacts (FIG. 1, 102) within a container (FIG. 1, 104) relate to a similar field of application. For example, a first artifact (FIG. 1, 102) may relate to a dictionary of clinical terms and another artifact (FIG. 1, 102) may be a set of rules for how to process unstructured text in the context of a particular clinical condition.

Via the builder (310), certain metadata is also associated with the artifact (FIG. 1, 102) which metadata is used to retrieve the deployment descriptors that indicate how the artifact (FIG. 1, 102) is to be deployed and how the content, i.e., the dictionary, set of rules, json object, etc. is to be made accessible, and to which cognitive services (FIG. 1, 106) it is to be made available. The deployment descriptors may also provide instructions on how to add, update, and delete an artifact (FIG. 1, 102).

Once built, an orchestrator (312) of the computing system (308) deploys the container (FIG. 1, 104) and specifically processes each of the artifacts (FIG. 1, 102) that make up the container (FIG. 1, 104). During deployment, for each artifact (FIG. 1, 102), the orchestrator (312) identifies a set of deployment descriptors which identify how the artifact (FIG. 1, 102) is to be executed in the cognitive service (FIG. 1, 106). As described above, the identification of the deployment descriptors may be based on the metadata associated with the artifact (FIG. 1, 102) via the builder (310).

Based on this information, the orchestrator (312) pushes the content of the artifact (FIG. 1, 102) to be accessible to the cognitive service(s) (FIG. 1, 106) that rely on that artifact (FIG. 1, 102). Accordingly, any end user that subscribes to that cognitive service (FIG. 1, 106) can have access to the artifact (FIG. 1, 102).

An instantiator (314) of the computing system (308) then instantiates the container (FIG. 1, 104) making it available to the cognitive service (FIG. 1, 106) and its subscribers. That is, once instantiated, a user can process unstructured text into structured text. Note that this instantiation occurs without shutting down the computer. That is, an old artifact may be moved out of the container (FIG. 1, 104) and a new one placed in it such that upon runtime the new artifact (FIG. 1, 102) is executed while the old one is no longer available in the container (FIG. 1, 104). In some examples, the computing system (308) may be a distributed system, with the different components disposed on different physical devices.

Figure 4:
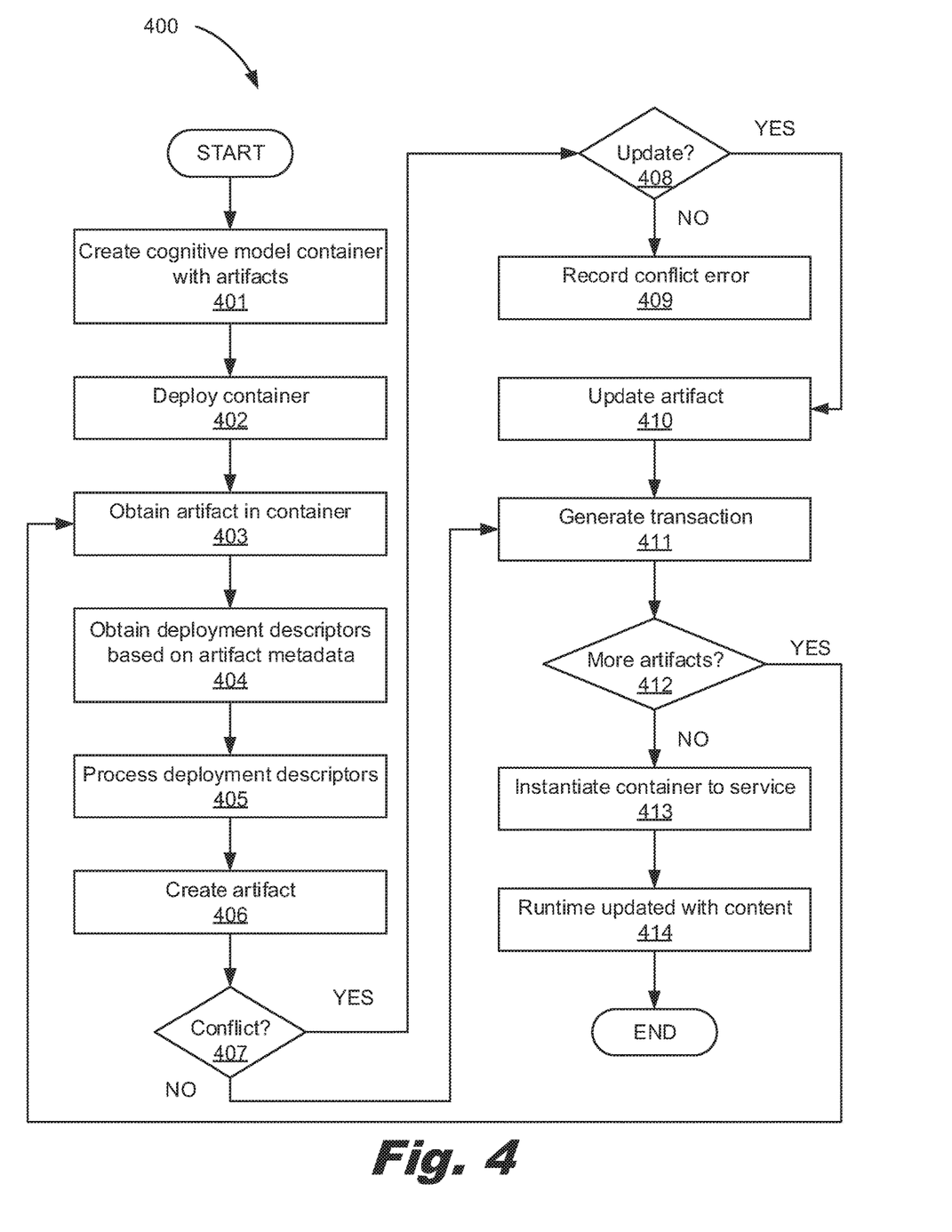
FIG. 4 depicts a flowchart for updating artifacts used by a cognitive service, according to another example of the principles described herein.

FIG. 4 depicts a flowchart of a method (400) for updating artifacts (FIG. 1, 102) used by a cognitive service (FIG. 1, 106), according to another example of the principles described herein. According to the method (400), a cognitive model container (FIG. 1, 104) with artifacts (FIG. 1, 102) is created (block 401) to align with a particular cognitive model. The container (FIG. 1, 104) is then deployed (block 402). These operations may be carried out as described above in connection with FIG. 2.

During deployment, the computing system (FIG. 3, 308), and more specifically the orchestrator (FIG. 3, 312) of the computing system (FIG. 3, 308), obtains (block 403) the artifacts (FIG. 1, 102) in the container (FIG. 1, 104) and obtains (block 404) the deployment descriptors based on the metadata associated with an artifact (FIG. 1, 102). At this point, the content of the artifact (FIG. 1, 102) is pushed to the cognitive services (FIG. 1, 106) by processing the deployment descriptors. That is, for each artifact (FIG. 1, 102), the orchestrator (FIG. 3, 312) loads the deployment descriptors and pushes the content to the appropriate cognitive service (FIG. 1, 106) based on the details of the deployment descriptor.

The artifact (FIG. 1, 102) is then created (block 406) via the instantiator (FIG. 3, 314). In some examples, the method (400) further includes determining (block 407) if a conflict occurs with already existing artifact (FIG. 1, 102) in the container (FIG. 1, 104). Such a conflict may indicate that an existing version of the artifact (FIG. 1, 102) albeit an earlier version, is present in the container (FIG. 1, 104). In other words, if a container (FIG. 1, 104) has been updated and is being re-deployed in its updated state, a user of a system may have the option to control whether the artifacts (FIG. 1, 102) that already exist are to be updated. If an artifact already exists and the user indicates that the artifact should not be updated, then a conflict exists. If there is no conflict, (block 407, determination NO), the process continues. However, if there is a conflict (block 407, determination YES), it is determined (block 408) whether a cognitive service (FIG.

1, 106) should be updated with the new artifact (FIG. 1, 102)/container (FIG. 1, 104). If the cognitive service (FIG. 1, 106) should not be updated (block 408, determination NO), then an error message may be generated and the system may record (block 409) a conflict error. Such information may be used for diagnostic or repair operations. If the cognitive service (FIG. 1, 106) should be updated (block 408, determination YES), the artifact (FIG. 1, 102) is updated (block 410) based on the deployment descriptor.

In some examples, a transaction may be generated (block 411) for a set of updates. The generation of a transaction waits until a set of updates is performed and batch updates different artifacts (FIG. 1, 102). Such a transaction allows for an undo function in case one of the artifacts (FIG. 1, 102) does not update properly. Accordingly, the method (400) includes determining (block 412) if there are more artifacts (FIG. 1, 102) to process. If there are, (block 412, determination YES), the method (400) obtains (block 403) a subsequent artifact (FIG. 1, 102) for processing. If there are no more artifacts (FIG. 1, 102) to process (block 412, determination NO), the container (FIG. 1, 104) may be instantiated. That is, the container (FIG. 1, 104) is instantiated (block 413) when all artifact (FIG. 1, 102) updates have been included in the transaction. Once the container (FIG. 1, 104) has been instantiated (block 413), a service is executed and utilizes the instantiated container (FIG. 1, 104) to obtain the contents of the artifact (FIG. 1, 102) and thereby produces the cognitive annotation output based on the user's input unstructured text.

Figure 5:
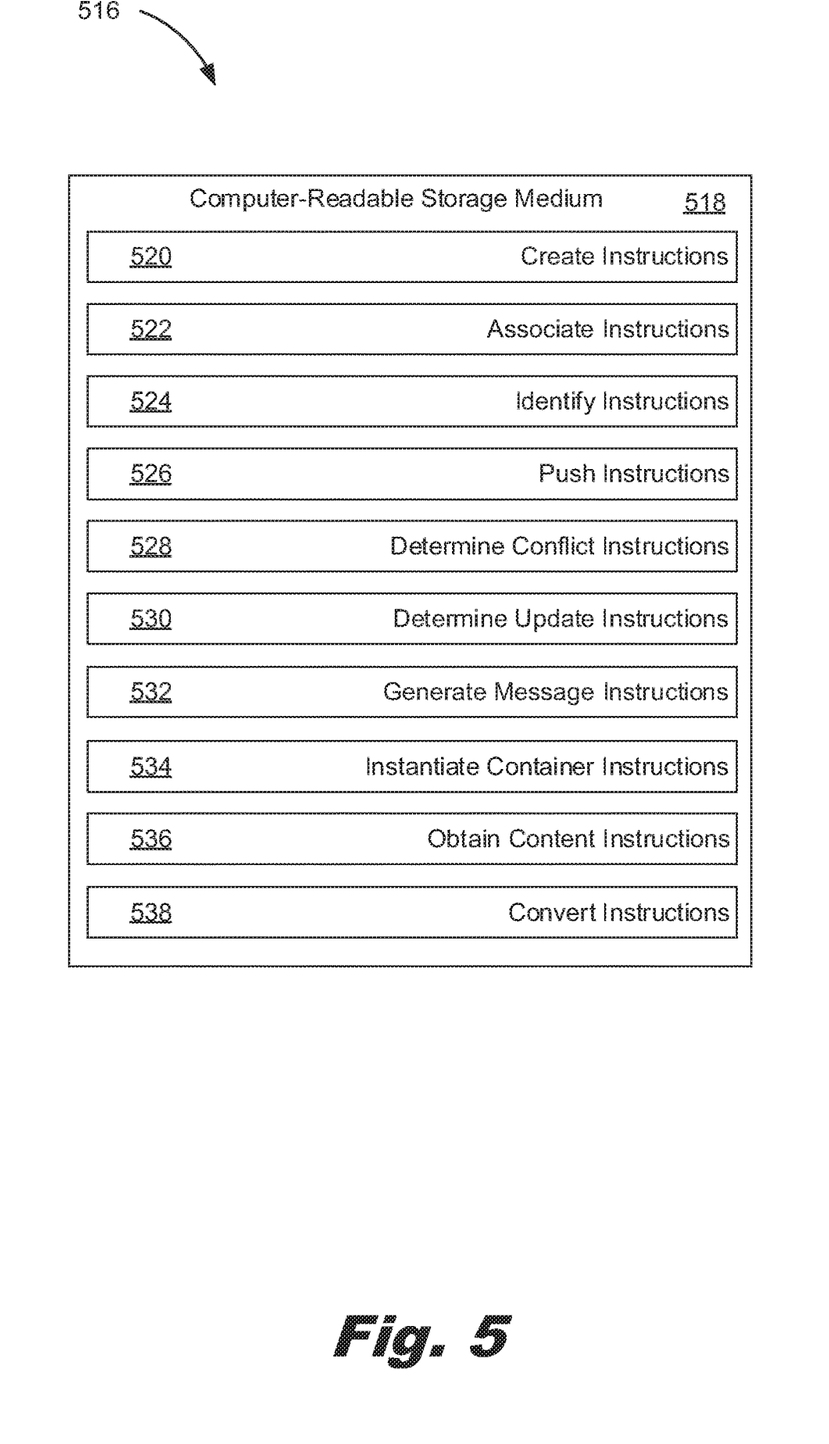
FIG. 5 depicts a computer program product with a computer readable storage medium for updating artifacts used by a cognitive service, according to an example of principles described herein.

FIG. 5 depicts a computer program product (516) with a computer-readable storage medium (518) for updating container artifacts, according to an example of principles described herein. To achieve its desired functionality, a computing system includes various hardware components. Specifically, a computing system includes a processor and a computer-readable storage medium (518). The computer-readable storage medium (518) is communicatively coupled to the processor. The computer-readable storage medium (518) includes a number of instructions (520, 522, 524, 526, 528, 530, 532, 534, 536, 538) for performing a designated function. The computer-readable storage medium (518) causes the processor to execute the designated function of the instructions (520, 522, 524, 526, 528, 530, 532, 534, 536, 538).

Referring to FIG. 5, create instructions (520), when executed by the processor, cause the processor to create a cognitive model container (FIG. 1, 104), which container (FIG. 1, 104) includes a set of artifacts (FIG. 1, 102). Each artifact (FIG. 1, 102) includes 1) content used by a cognitive service (FIG. 1, 106) to convert unstructured text into structured text and 2) metadata. Associate instructions (522), when executed by the processor, may cause the processor to associate metadata with each artifact (FIG. 1, 102). Identify instructions (524), when executed by the processor, may cause the processor to identify for each artifact (FIG. 1, 102), using the metadata associated with the artifact (FIG. 1, 102), a set of deployment descriptors which indicate how the artifact (FIG. 1, 102) is to be executed in the cognitive service (FIG. 1, 106). Push instructions (526), when executed by the processor, may cause the processor to push the content to a number of cognitive services (FIG. 1, 106) based on the deployment descriptors. Determine conflict instructions (528), when executed by the processor, may cause the processor to determine if a conflict occurs with an already existing artifact (FIG. 1, 102) in the container (FIG. 1, 104). Determine update instructions (530), when executed by the processor, may cause the processor to, when a conflict occurs, determine if the service (FIG. 1, 106) should be updated with the artifact (FIG. 1, 102). Generate message instructions (532), when executed by the processor, may cause the processor to, when a conflict occurs, generate an error message. Instantiate container instructions (534), when executed by the processor, may cause the processor to, instantiate the container along with the set of artifacts to the cognitive service. Obtain content instructions (536), when executed by the processor, may cause the processor to, during runtime execution of the container (FIG. 1, 104), obtain the content. Convert instructions (538), when executed by the processor, may cause the processor to, during runtime execution of the container (FIG. 1, 104), convert unstructured text into structured text based on the content of the artifact (FIG. 1, 102).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method, comprising:
creating a cognitive model container, which container comprises a set of artifacts, each artifact comprising:
content used by a cognitive service to convert unstructured text into structured text; and
metadata;
during container deployment:
determining a grouping of containers to deploy to the cognitive service, wherein:
different groupings of containers are deployed to different cognitive services; and
a single container is deployed to different cognitive services as part of the different groupings;
identifying, for each artifact, a set of deployment descriptors which identify how the artifact is to be executed in the cognitive service; and
pushing the content of an artifact to a number of cognitive services based on the deployment descriptors;
instantiating the container along with the set of artifacts to the cognitive service; and
during runtime execution of the container:
obtaining the content of an artifact; and
converting unstructured text into structured text based on the content of the artifact.

2. The computer-implemented method of claim 1, further comprising associating metadata with each artifact.

3. The computer-implemented method of claim 1, wherein, the set of deployment descriptors is identified from the metadata of the artifact.

4. The computer-implemented method of claim 1, wherein pushing the content of an artifact to the cognitive service is done via hypertext markup language (HTML) processing.

5. The computer-implemented method of claim 1, wherein the number of cognitive services are identified in the deployment descriptors.

6. The computer-implemented method of claim 1, further comprising determining if a conflict occurs with an existing artifact in the container.

7. The computer-implemented method of claim 6, further comprising, when a conflict occurs, determining based on a deployment descriptor associated with the artifact, how the artifact is to be updated.

8. The computer-implemented method of claim 7, further comprising, when the service is not to be updated, generating an error message.

9. The computer-implemented method of claim 7, further comprising when the service is not to be updated, recording a conflict error.

10. The computer-implemented method of claim 1, further comprising generating a transaction comprising multiple artifact updates.

11. The computer-implemented method of claim 10, wherein the container is instantiated when all artifact updates have been included in the transaction.

12. The computer-implemented method of claim 1, wherein instantiating the container along with the set of artifacts comprises at least one of:
replacing an existing artifact in the container with a replacement artifact; and
placing a newly created artifact in the container.

13. The computer-implemented method of claim 1, wherein the instantiation is performed independently of a system reboot.

14. A computing system, comprising:
a builder, comprising a processor and memory, to create a cognitive model container, which container comprises a set of domain-specific artifacts, each artifact comprising:
content used by a cognitive service to convert unstructured text into structured text; and
metadata;
an orchestrator, comprising a processor and memory, to, during container deployment and prior to making the container available via instantiation:
determine a grouping of containers to deploy to the cognitive service, wherein:
different groupings of containers are deployed to different cognitive services; and
a single container is deployed to different cognitive services as part of the different groupings;
identify, for each artifact, a set of deployment descriptors which identify how the artifact is to be executed in the cognitive service; and
push the content of an artifact to a number of cognitive services based on the deployment descriptors; and
an instantiator, comprising a processor and memory, to instantiate the container along with the set of artifacts to the cognitive service.

15. The computing system of claim 14, wherein the artifacts within a container relate to a similar field of application.

16. The computing system of claim 14, wherein a deployment descriptor identifies a cognitive service which is to call the artifact to be executed.

17. The computing system of claim 14, wherein a deployment descriptor provides instructions on how to add, update, and delete an artifact.

18. A computer program product, the computer program product comprising a computer readable storage medium having program instructions embodied therewith, the program instructions executable by a processor to cause the processor to:
create a cognitive model container, which container comprises a set of domain-specific artifacts, each artifact comprising:
content used by a cognitive service that converts unstructured text into structured text comprising:
a domain-specific dictionary of terms to identify domain-specific terms;
definitions of clinical attributes; and
rules to infer clinical attributes; and
metadata to trigger deployment descriptors;
associate metadata with each artifact;
during container deployment and prior to making the container available via instantiation:
identify, for each artifact using the metadata associated with the artifact, a set of deployment descriptors which:
identify how the artifact is to be executed by the cognitive service;
identify an end-point, mime-type, and hypertext transfer protocol operation, about the cognitive service; and
comprise conditions to identify which cognitive service to use for deployment; and
push the content of an artifact to a number of cognitive services based on the deployment descriptors;
determine if a conflict occurs with an existing artifact in the container;
when a conflict occurs, perform at least one of:
determine if the service should be updated with the artifact; and
generate an error message;
instantiate the container along with the set of artifacts to the cognitive service; and
during runtime execution of the container:
obtain the content of an artifact; and
convert unstructured text into structured text based on the content of the artifact.

19. The computer program product of claim 18, wherein instantiation of the container to the cognitive service is done without a system reboot.

* * * * *